United States Patent Office 3,169,142
Patented Feb. 9, 1965

3,169,142
METHOD FOR SULFONATION AND SULFATION OF ORGANIC COMPOUNDS
Edward A. Knaggs, Deerfield, and Marvin L. Nussbaum, Skokie, Ill., assignors to Stepan Chemical Company, Chicago, Ill., a corporation of Delaware
Filed May 25, 1960, Ser. No. 31,707
10 Claims. (Cl. 260—457)

The present invention relates broadly to the art of detergent and surface active agent manufacture, and is more particularly concerned with a process and apparatus for the continuous sulfonation and sulfation of organic compounds featuring an extremely rapid film reaction between the organic compound flowing on the walls of a heat exchanger-reactor under conditions of high turbulence produced by a mixture of sulfur trioxide and diluent gas ejected from a nozzle under pressure.

It has long been known to sulfonate alkyl aromatic hydrocarbons by batch operations utilizing either the oleum or sulfur trioxide-solvent methods. In the former technique, the hydrocarbon is treated with a large excess of 20% oleum to drive the reaction to completion, after which the mixture is diluted with water and then stratified to separate the sulfonic acid from the bulk of excess diluted sulfuric acid, after which the sulfonic acid is converted to the sulfonate by neutralization. The sulfur trioxide-solvent batch process, on the other hand, may be practiced by passing a stream of liquid heptane, hexane or pentane at particular pressures and temperatures into a mass of sulfur trioxide to entrain a portion of the sulfur trioxide in the liquid inert paraffin hydrocarbon, effecting an admixture with a sulfonatable organic compound, refluxing the inert paraffin hydrocarbon vaporized by the resulting sulfonation reaction, and thereafter vaporizing said hydrocarbon from the sulfonation reaction product.

Each of the summarized prior art sulfonation processes leaves much room for improvement in productivity, quality of the sulfonate and economy. Specifically as to the solvent sulfonation process, the solvent losses are generally rather large, there are hazards in handling the flammable solvents, solvent removal is often difficult with the result that there is a residual odor in the sulfonate, and it is not infrequent that partial solvent sulfonation takes place to cause contamination of the products.

There are several other possible solvent $SO_3$ sulfonation processes that are believed to be practiced in the industry, some of which include the vaporization of $SO_3$ and the subsequent introduction into a solvent system comprising the material to be sulfonated with a petroleum solvent system, the $SO_3$ gas being with or without further diluent gas. Persons familiar with the art will realize there are many possible alternative processes therein. There have been publicized batch $SO_3$ processes used in the industry in the last few years wherein the material to be sulfonated, such as dodecylbenzene, is mixed in an agitated vessel and $SO_3$ gas diluted with high volumes of air for gas dilution purposes. In such a batch operation the process is generally conducted at a compromised temperature, that is, at as high a temperature as is feasible so as to reduce the viscosity to achieve better mixing and reaction conditions, but consistent with product color stability properties which are related to reaction temperature and processing time factors. Generally such a dodecylbenzene sulfonation is conducted by passing $SO_3$ diluted with a dry air stream comprising 7% $SO_3$ gas and 93% air into the dodecylbenzene maintained in a mixing vessel with cooling means provided, and the $SO_3$ introduced over a several hour period at a reaction temperature of approximately 50° C.–55° C. Such a batch process, therefore represents a distinct compromise between reaction temperatures and product color stability.

To avoid these and other known difficulties in the batch processes it has been proposed to use a moving scraper blade reaction vessel with a cooling surface in the continuous sulfur trioxide sulfonation of aromatic hydrocarbons. In this method, there is introduced at a point closely in advance of the progressively moving scraper a gaseous mixture of sulfur trioxide in dry air into a film of the aromatic hydrocarbon, followed by successively reapplying the film to effect complete sulfonation. However, the required equipment is relatively costly and cumbersome, and the color of the resulting sulfonate often fails to meet the specification required for household detergent applications.

It is accordingly an important aim of the instant invention to provide a method and apparatus for the continuous sulfonation and sulfation of organic compounds, featuring the use of a sulfur trioxide-diluent gas mixture to produce marked turbulence in a moving film of the organic compound.

Another object of this invention lies in the provision of a method of introducing the sulfo radical in the molecule of an organic charging stock, wherein turbulence is produced in a film of the stock by an inert gas carrying one of the reactants, and wherein film turbulency is effected essentially simultaneously with controlled reduced film viscosity and heat exchange to rapidly dissipate the exothermic heat of the sulfonation or sulfation reaction.

Still another object of this invention is to provide apparatus for effecting sulfation and sulfonation reactions, comprising a housing mounting therewithin a plurality of reactor tubes, means for introducing a sulfonatable organic compound into film forming relation with the inner walls of said tubes, and means for discharging an inert gaseous medium containing sulfur trioxide under pressure against said film to produce marked turbulency in the film forming a liquid sulfonic acid or sulfate intermediate product which is collected from the lower ends of the reactor tubes.

A further objects of the instant invention lies in the provision of apparatus of the character described, additionally featuring heat exchange means in surrounding relation to the reactor tubes to controllably reduce the film viscosity to a level which will assure the desired marked film turbulency upon impingement by the inert gaseous medium and sulfur trioxide.

A still further object of this invention is to provide a process and apparatus for the sulfation and sulfonation of organic compounds, in which there is effected and maintained close control of variables such as throughput, sulfur trioxide dilution, gaseous jet linear velocity, gaseous tube velocity, residence time, film reaction temperature and heat exchange and other factors.

Other objects and advantages of the invention will become more apparent during the course of the following description, particularly when taken in connection with the accompanying drawings.

In the drawings, wherein like numerals designate like parts throughout the same:

FIGURE 3 is a detail sectional view of the upper end of the reactor to more fully illustrate an exemplary form of nozzle structure and reservoirs for the sulfur trioxide-gas mixture and sulfonatable organic compound.

Figure 1:
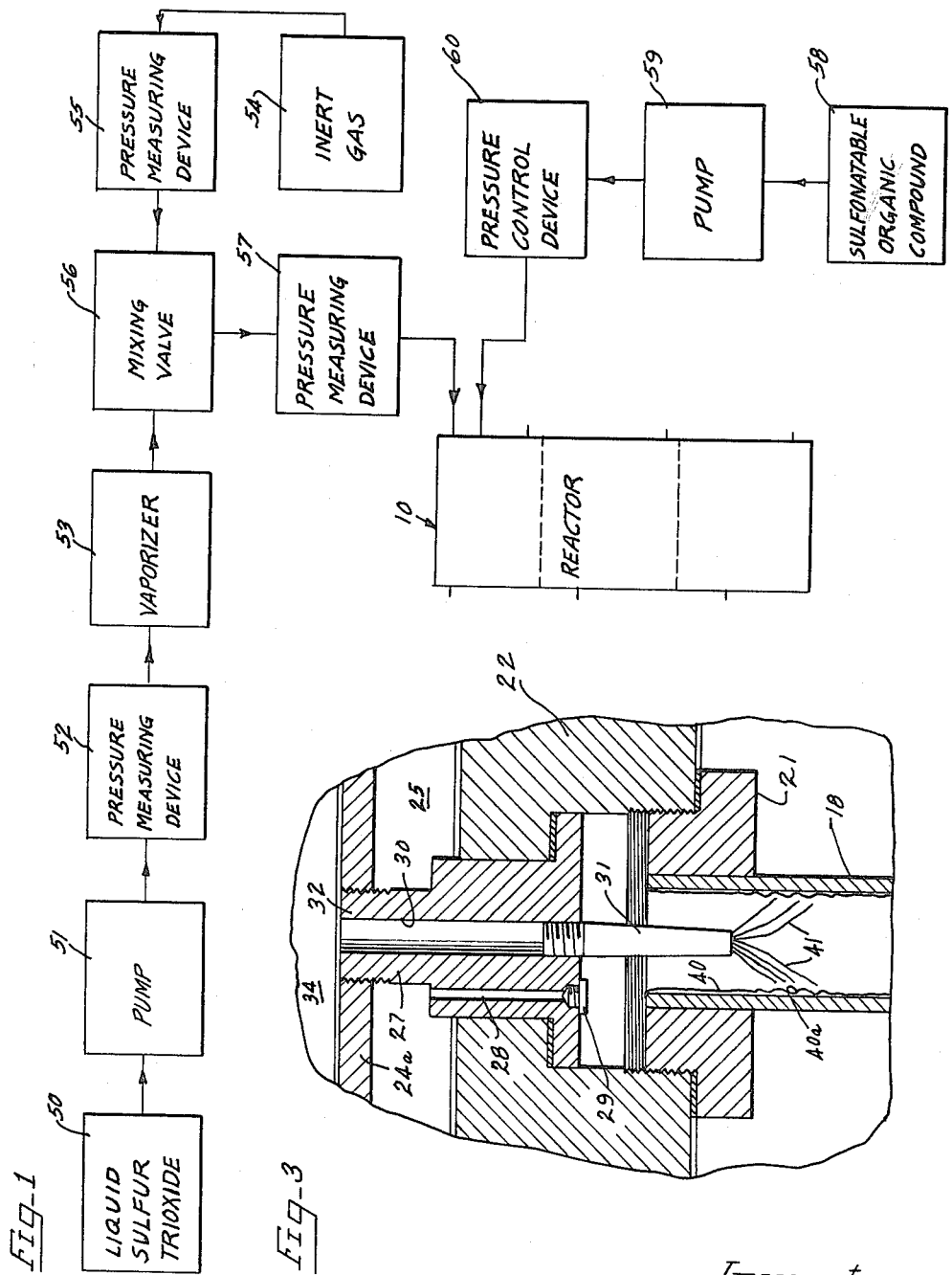
FIGURE 1 is a flow diagram illustrative of means effective to practice the novel concepts of this invention.

During the course of the description now to follow, reference will be made therein to a "sulfonation" reaction, and it is to be understood that the scope of this term is intended to apply equally to generically designated sulfonation reactions utilizing an organic compound containing a reactive hydroxyl group in the structure of the compound and in which the product contains a sulfate rather than a sulfonic acid substituent. Accordingly, by reference to a sulfonation reaction in the instant disclosure, the intent is that this term apply to either reaction which results in the substitution of the sulfo radical in the molecule of the initial starting material.

In addition to producing particularly satisfactory results in either sulfonation or sulfation reactions, the process of this invention may also be employed with a wide variety of starting materials. The starting material or charging stock is herein referred to as a "sulfonatable or sulfatable organic compound," and within this classification there is included the phenols and alkyl phenols; aromatic hydrocarbons such as the various benzene derivatives containing a nuclearly displaceable hydrogen atom, and the polycyclic aromatic hydrocarbons containing naphthyl, phenanthryl, and anthryl, nuclei; alcohols of both the aliphatic and cyclo-aliphatic series; heterocyclic compounds such as thiophene, pyridine and the like; olefinic hydrocarbons such as octene, decene, etc.; cycloolefins and their alkyl substituted derivatives, such as cyclohexene and ethylcyclohexene; ethers and esters, such as methyl esters, phenylmethyl ether and the fatty acid glycerides respectively, the latter class comprising such compounds as the glyceride mono-esters of oleic acid, etc.; acids, such as benzoic acid; and various derivatives of the named classes of compounds containing substituents such as one or more radicals of the group comprising: halo, nitro, amino, keto, carboxyl, etc. The novel results obtained and the particular conditions employed will be later described in connection with a number of examples, wherein preparation of the sulfate or sulfonic acid product of the following compounds is described: dodecyl benzene, lauryl alcohol, lauryl alcohol with 2–3 mols ethylene oxide addition or an average of 2½ mols, nonyl phenol with 4 and 5 mols ethylene oxide addition, and a mixture of methyl palmitate and methyl stearate.

Sulfonation of one of the named organic compounds is herein effected by inducing marked turbulence in a flowing film of the compound by impinging the film with a pressurized stream of an inert diluent and vaporized sulfur trioxide. The inert diluent gas may take various forms such as dry air, nitrogen, carbon dioxide, carbon monoxide, sulfur dioxide, a halogenated hydrocarbon, or a low molecular weight paraffinic hydrocarbon, such as methane, ethane, propane, butane, or a mixture thereof with other inert gases, such as the gaseous by-product of a hydrocarbon cracking reaction containing hydrogen, methane, ethane, propane, etc. The sulfur trioxide, on the other hand, may be provided by a stabilized liquid sulfur trioxide having more than 99% available $SO_3$ content, and offered for sale under the trade name "Sulfan." If desired, however, the sulfur trioxide can be in the form of purified converter gas. As will be later specifically noted, the sulfur trioxide is diluted with the dry diluent gas within the range of from 5:1 to 50:1, air to sulfur trioxide by volume.

In accordance with the principles of this invention, and as appears in FIGURE 1, a sulfonatable organic compound is treated with a mixture of sulfur trioxide and an inert gas by pumping or otherwise feeding liquid sulfur trioxide from a suitable source through a flow measuring device to a flash vaporizer, while directing diluent gas through a flow measuring device to a mixing valve whereat the inert gas and vaporized sulfur trioxide are mixed to dilute the vaporized sulfur trioxide with a preferred volume of from about 93 to about 98% diluent gas. In this regard, the diluent gas may be either blended with the sulfur trioxide gas after vaporization of the sulfur trioxide or the diluent gas may pass into the vaporizer to blend with the sulfur trioxide. As well, it may be desired to pre-heat the diluent gas to about 40–50° C. to insure that no sulfur trioxide will subsequently be condensed.

The diluted sulfur trioxide is thereupon directed at a back pressure of approximately 4 to 6 pounds per square inch to a gas reservoir provided within the reactor construction of this invention, while a sulfonatable organic compound is pumped from a suitable source through a pressure control device, and heated if required to reduce the viscosity, whereupon the sulfonatable organic compound is directed to reservoir of the reactor. The structural details of the reactor will be later described, although it may now be noted that the sulfonatable organic compound is caused to flow through a plurality of sized orifices onto the inner walls of a plurality of downwardly inclined reactor tubes in film forming relation. The film of the organic compound is impinged by the diluted and vaporized sulfonating agent at substantial velocities to create marked turbulency in the film and an essentially instantaneous reaction therewith whereby said liquid film will be subjected for substantially only an instant of time (within substantially 0.5 second) to the aforesaid diluted and total vaporized sulfonating agent previously defined as being formed of a predetermined inert gas to sulfur trioxide volume ratio within the typical range of 5:1 to 50:1).

The reactor tubes are surrounded by heat exchange means which may take the form of cooling jackets providing means for circulating steam, hot water or cold water to immediately remove the exothermic heat of the sulfation reaction to prevent formation of colored by-product impurities. It is within the contemplation of this invention that the upper section of each tube may be cooled by steam, whereas the intermediate and lower section of each tube is cooled with heated, unheated or chilled water. In this way, the upper portions of the reactor tubes are cooled to a degree sufficient for effective heat exchange to remove the exothermic heat of the reaction, and yet the organic compound film is maintained at a sufficiently relatively high temperature so that the film viscosity is sufficiently low to induce marked film turbulence and a minimum contact or gas residence time. By the method and apparatus of this invention, a sulfate or sulfonic acid product is obtained which has a free oil content generally below 2% so that it meets the unsulfonated oil requirements for household detergent applications. The color of the products derived is also acceptable for such applications. As will be later described in detail, this improved quality, and as well improved productivity and improved economy, are obtained by carefully blending and controlling film viscosity, film turbulence, film temperature, heat exchange, product throughout and gas dilution within the given geometric design of the unit.

Figure 2:
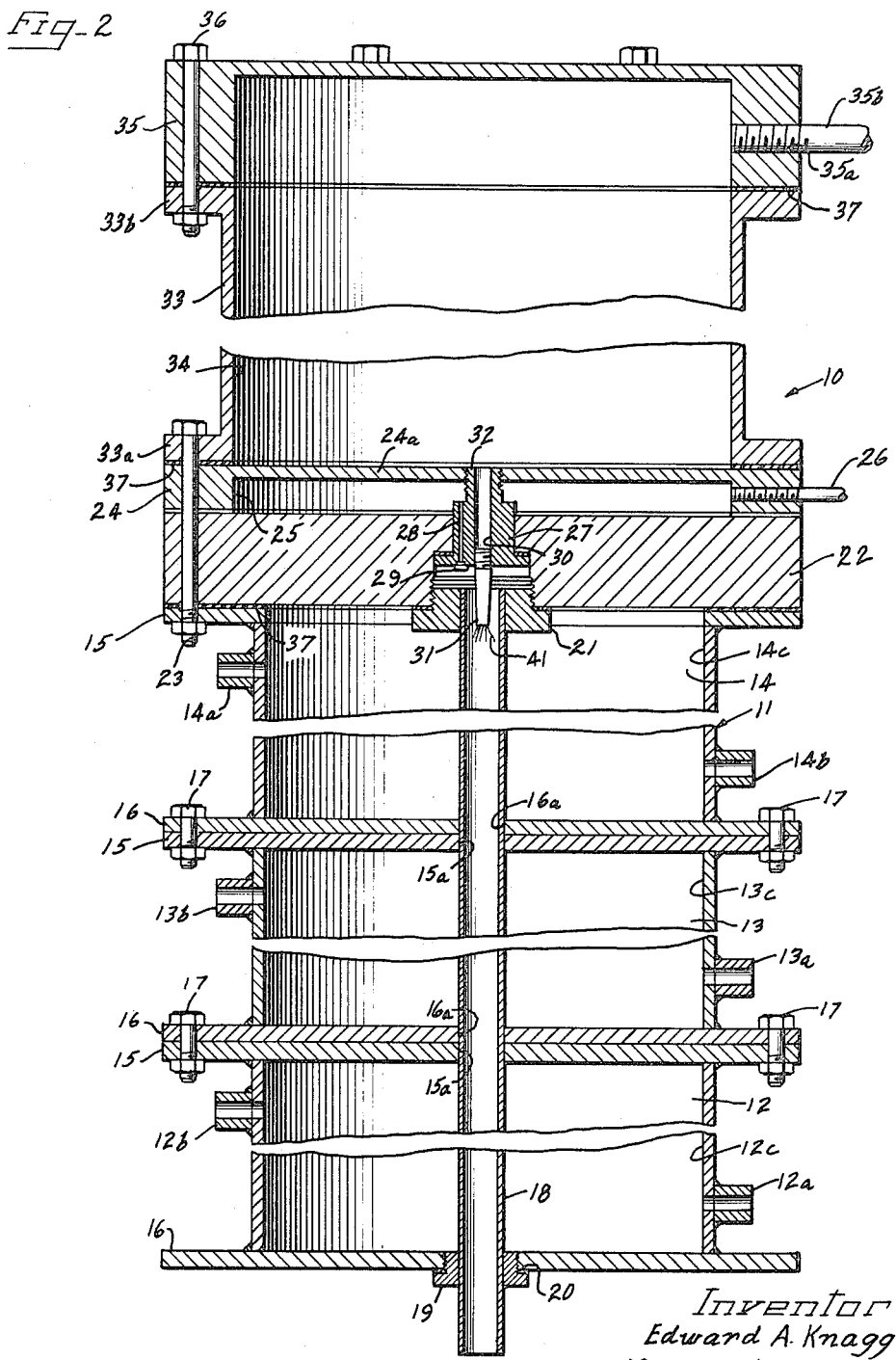
FIGURE 2 is a side elevational view, with parts broken away and with parts taken in section, showing a reactor constructed in accordance with the principles of this invention.

A reactor constructed in accordance with the principles of this invention for sulfonation and sulfation reactions is designated generally in FIGURES 2 and 3 by the numeral 10. As shown therein, the reactor 10 comprises a generally upright housing 11, which may if desired be downwardly inclined approximately 30° to the horizontal, although experience has demonstrated that maintenance of the housing 11 in an assentially vertical position is more productive of uniform film thickness and effective heat exchange. The housing 11 may be divided into a plurality of sections 12, 13 and 14 to permit variance in the type of cooling fluid admitted to the interiors of the housing portions 12–14 by conduits 12a–14a and discharged therefrom through conduits 12b–14b. The housing portions 12–14 are hollow and define therewithin cooling chambers 12c–14c closed at opposite ends by upper and lower plate means 15 and 16, so that by way of example steam can be admitted to the upper chamber 14c, heated water to the intermediate chamber 13c and cold water to the bottom chamber 12c. Bolt means 17 may connect the intermediate housing 13 to the upper and lower housings 14 and 12.

The plate means 15 and 16 are apertured at 15a and 16a to receive therethrough one or a plurality of reactor tubes 18, which in the illustrative showing of FIGURES 2 and 3 is a single tube, although of course this may be widely varied. As is shown, the reactor tube 18 is held in position at its lower end by nut means 19 bearing against gasket means 20, while the opposite or upper end of the tube 18 mounts threaded collars 21 turned into a threaded aperture or stepped bore 22a in a block member 22 seated upon the upper housing section 14 and secured thereto by bolt means 23. Each reactor tube 18 is preferably constructed of stainless steel, has a smooth inner diameter (i.e., provides a cylindrical surface), and has an inner diameter and length calculated in accordance with a predetermined sulfur trioxide throughput and particular percentage range of dilution of the sulfonating agent with inert gas. Specific dimensions of reactor tubes tested will be noted in connection with the examples to be later discussed.

It is understood and within the scope of this invention that the reactor tubes may be designed into the unit so that the tubes are either welded or pressure fitted or rolled into the end plates. The foregoing description of the subject invention should not be construed as limiting in that there are obviously many alternative means of constructing the device within the intention of the invention.

Mounted upon the block member 21 and secured thereto by the bolt means 23 is a separator member 24 defining therewithin an annular chamber or reservoir 25 for sulfonatable organic compound supplied thereto under pressure through an inlet 26. The upper end of the threaded aperture 22a in the block member 22 receives an apertured threaded plug member 27 extending into the chamber 25 and provided with a passage 28 into the lower end of which is threaded a nozzle member 29. The threaded plug member 27 is further provided with a central passage 30 threadably receiving at one end a nozzle member 31 for the sulfur trioxide-inert gas mixture, the opposite end of said passage 30 being surrounded by a reduced diameter portion 32 on said plug member 27 threadably received in an upper wall 24a of the separator member 24. Exemplary bore dimensions for the nozzle members 29 and 31 will be later noted.

Seated upon the separator member 24 is a tubular spacer 33 defining therewithin a gas chamber or reservoir 34, the spacer 33 being provided at opposite ends with outwardly turned flange portions 33a and 33b. The flange portion 33a connects to the separator member 24, block member 22 and upper housing portion 14 by the bolt means 23, while the upper flange portion 33b on the spacer 33 receives thereupon a cap or head member 35 defining the upper end of the gas chamber 34. The head member 35 and spacer flange portion 35b may be connected by bolt means 36, and the head member 35 is apertured at 35a to threadably receive a gas inlet connection 35b. In accordance with customary practice in the art, gasket means 37 may be employed between the upper housing portion 14 and block member 22, between said block member and the separator member 24, between said separator member and the tubular spacer 33, and at other locations as may be required.

Extensive investigations with the apparatus of FIGURES 2 and 3 have demonstrated that the quality of the sulfonated product obtained from the lower end of the reactor tube 18 is dependent upon the sulfur trioxide throughput and dilution, the cooling media temperature, velocity and flow rate, the sulfur trioxide-inert diluent temperature and pressure, the linear velocity of the gaseous jet at the end of the nozzle 31, the velocity of the gas through the reactor tubes 18, and the gaseous reaction or residence time, and is specifically related to geometric consideration and relationships of reactor tube inside diameter, and gas and liquid nozzles. The specific value of each variable is of course dependent upon a number of factors and will be different with the particular hydrocarbon being sulfonated; however, generally stated a sulfur trioxide throughput of from one pound per hour to four pounds per hour for each reactor tube 18 produces successful results using a dilution of about 93 to 98% nitrogen or dry air. A gas temperature of about 40 to 50° C. has also been found desirable at a line pressure of from 4 to 7 p.s.i. The gaseous residence time is generally between 0.1 and 0.2 second. The temperature, velocity and flow rate of cooling media admitted to the chambers 12c–14c will be later discussed in connection with examples directed to specific hydrocarbons, and the gaseous jet linear velocity and gaseous tube velocity will also be dealt with specifically hereinafter. However, it may now be noted that the gaseous jet velocity is related to the bore of the gas jet nozzle 31, the sulfur trioxide dilution product throughput and gas line pressure. Tube diameter and total gas flow of course determine the gaseous tube velocity.

In tests performed to date, it has been found desirable that each reactor tube 18 have an inner diameter of 0.43 inch (and is thus cylindrical), a length of 6.0 feet and a wall thickness of 0.035 inch. Generally speaking, use of tubes of a relatively smaller inner diameter would require a substantially greater number of tubes at a lower sulfur trioxide throughput, while a larger inner diameter for the reactor tubes may produce either a large quantity of unreacted sulfur trioxide in the effluent gas, or an unacceptable product from the standpoint of free oil content and dark color. A relatively shorter reactor tube of the order of 4 feet, on the other hand, may also produce a darkened product, while varying the wall thickness within reason appears to have little effect on the heat exchange properties, so that a wall thickness of 0.035 inch is desirable from the standpoint of good corrosion life. The bore of the hydrocarbon jet 29 is of course selected to fulfill a particular flow rate at a relatively high pressure so as to minimize the effect on the hydrocarbon flow of possible variations in reaction to downstream back-pressures. Satisfactory results have been obtained using a jet of 0.0145 inch bore with a depth of 0.012 inch in order to obtain a flow of 90 grams per minute at about 25 pounds per square inch pressure on the hydrocarbon.

The foregoing description with regard to tube dimensions should not be limiting according to the terms of this invention. Considerable latitude exists with regard to tube length. This is related to the particular material being sulfonated or sulfated and to the particular heat exchange or cooling media. Variations in processing means may be accomplished within the scope of the subject invention such as that of conducting the sulfonation reaction under relatively high temperature conditions wherein the sulfonated material is ejected from the reactor tubes at relatively high temperatures and at temperatures where the product is relatively unstable and after which the recovered acid is immediately quenched to a temperature rapidly in a subsequent operation following ejection from the reactor tube. Alternatively the sulfonation may be consummated in the reactor tube upper portions and cooled or partially cooled in the lower reaction portions of the reactor tube itself.

In connection with the bore size of the gas nozzle 31, it is important to note that one feature of the instant invention is the production of great turbulence or agitation of the hydrocarbon film by impingement with high velocity gas. Experiments have demonstrated that the sulfonation reaction is essentially complete in approximately the first foot of the reactor tube 18, and probably within a much shorter distance and accordingly, it is highly important for reasons of effecting the rapid reaction and rapid heat exchange that marked turbulence be produced in this zone. In accordance with this invention, effective heat exchange is not only effected by the admission of coolant to the housing chamber 14c, thereby removing some of the exothermic heat of the sulfonation reaction, but as well there is provided a pressure drop from the point of entry of the sulfur trioxide-inert gas mixture into the reaction tubes 18 to the point of reaction of this mixture with the hydrocarbon film. This pressure drop is desirably of the order of 100%, and by way of specific example, when the gas line pressure is from 4 to 7 p.s.i. and the tube back pressure is 0.5 to 1½ p.s.i., there is obtained effective cooling of the gases in the area of the tube where the actual reaction is centered, and as well, there is produced by the pressure drop a relatively thinner hydrocarbon film and improved marked turbulence. As a result, the product obtained is not substantially tainted with undesirable colors, when properly balancing other process variables.

In order to produce the desired pressure drop or gas line pressure, generally of the order of 4 to 6 p.s.i., the gas jet nozzle 31 preferably has an inside diameter of 3.5 mm. and a 2.25 inch bore when employing a throughput of 4.0 pounds of sulfur trioxide per hour per tube and a sulfur trioxide-inert gas dilution of 91.6%. In connection with pressures, it may be now stated that in order to control the viscosity of the liquid hydrocarbon, not only is the temperature thereof regulated by balancing the amount of heat exchange performed against the requirement for reduced film viscosity, but the pressure on the liquid hydrocarbon is generally held within the range of from 5 to 50 p.s.i., and preferably at about 30 p.s.i. The film viscosity is generally between 1 and 20 cps., for the now apparent reason of proper film turbulence.

The invention will now be further described in connection with the following illustrative examples.

*Example I*

Dodecyl benzene sulfonic acid was prepared continuously in the apparatus of FIGURES 1 to 2 employing reactor tubes having an inner diameter of 0.43 inch, a wall thickness of 0.035 inch and a length of 6 feet. Utilizing a sulfur trioxide throughput of 4.0 pounds per hour per reactor tube component diluted with 91.6% nitrogen gas, a gas inlet temperature of 45 to 50° C., a gaseous line back pressure of 5 to 7 p.s.i. and a 3.5 mm. gas jet bore, produced a calculated linear gaseous jet velocity of 12,650 cm. per second and a gaseous tube velocity of 1345 cm. per second which is, of course, computed on the basis of cylindrical tube walls. Cooling water at 66° F. was admitted to the cooling jacket 14c at a rate of from 1.0 to 1.5 gallons per minute. The gaseous residence time was observed to be 0.14 second, and the product obtained from the lower end of the reactor tube 18, subsequent to neutralization with sodium hydroxide and drying, had a free oil content of 1.9% by weight, 0.8% $H_2SO_4$, and a color of FAC 3 as measured against the color of a triethanol amine salt of dodecyl benzene sulfonic acid at 60% active. The sulfonic acid as it emerged from the lower end of the reactor tube 18 was noted to have a temperature of 59° C., and the neutralized and dried product displayed a light transmissivity of 92.5% at 550 m./u. (10 mm. cell diameter).

*Example II*

Utilizing the same tube structure of the first example, sodium lauryl sulfate was prepared with a sulfur trioxide throughput of 2 pounds per hour per reactor tube component diluted with 92.6% nitrogen gas at a nitrogen gas flow rate of 82,200 cc./min. and a lauryl alcohol flow rate of 38 grams per minute. Cold water at 25° C. was circulated in the reactor jacket, and a pressure of 8 p.s.i. was applied to the lauryl alcohol reservoir. After the addition of the sulfur trioxide, it was noted that the line pressure increased to 4 p.s.i. and the flow rate of the nitrogen gas was 80,000 cc./min. The outlet temperature was 33 to 36° C. The product obtained had an acceptable color, and the unsulfonated matter content was within the limits of product acceptability, that is, from 2–4% unsulfated matter per 100% active acid basis.

*Example III*

Lauryl alcohol with 2–3 or an average of 2½ mols ethylene oxide addition was sulfated in the following manner. Water at a temperature of 90° F. was circulated through the reactor jacket, while the nitrogen gas flow was started through the gas jet. This rate amounted to about 85,900 cc. of nitrogen gas per minute per tube at a pressure of 3¼ p.s.i. Alcohol flow was initiated at a pressure of about 12 p.s.i. and at a temperature of about 30° C., producing a flow rate of 58 grams per minute, equivalent to 2.0 pounds of sulfur trioxide per hour per tube. The liquid sulfur trioxide at a pressure of about 18 pounds was then started into the flash vaporizer which had been heated to 100° C. This brought the nitrogen gas flow rate down to 83,500 cc./min. and raised the line pressure to 4⅓ pounds. The temperature of the emerging mixture of ethoxylated lauryl sulfuric acid and gases was 50°. The acid was collected in a jar and held for ten minutes before pouring it slowly into a mixture of 50% sodium hydroxide and water. The salt was then bleached with 0.15% hydrogen peroxide, and the product obtained increased in transmittance at 435 millimicrons from 76.5% to 93.5%.

In this same experimental work, dry air was substituted for nitrogen gas at an initial flow rate of about 78,800 cc. air/min. at 2¾ p.s.i. pressure. The operating flow dropped to 72,000 cc. air/min. at 3¼ p.s.i., and the transmittance of the salt increased from 51 to 92% after bleaching with 0.2% hydrogen peroxide. In these experiments the nitrogen gas-sulfur trioxide ratio was 95.7:4.3, while the air-sulfur trioxide ratio was 95:5.

*Example IV*

To sulfate nonyl phenol having 4 mols ethylene oxide addition, steam heat at between 5 and 7 p.s.i. was used on the inlet line for the hydrocarbon, and as well on the reactor jacket to produce a jacket temperature of 212–220 F. Nitrogen was started at a flow rate of about 86,900 cc. per minute at 3½ pounds. The back pressure on the nonyl phenol-ethoxylate was 14 pounds, and the compound was added to the reactor at this pressure and at a temperature of 190° F. The flow rate of the nonyl phenol-ethoxylate was 38 grams per minute, equivalent to 1 pound of sulfur trioxide per hour per reactor tube component. After the sulfur trioxide addition, the nitrogen gas flow rate dropped to 84,500 cc./min. at 4¼ pounds. The outlet temperature of the acid plus the gases was about 115° C., and upon emergence from the reactor, the acid was impinged upon a flask containing cold water, which dropped the temperature to about 45° C. This quick quenching is believed necessary in order to minimize acid decomposition. The acid was then slowly poured, with good stirring into a solution of ammonium hydroxide, 3A alcohol and water. The ratio of nitrogen gas to sulfur trioxide was 97.8:2.2.

*Example V*

The procedure of the preceding example was generally followed in sulfating nonyl phenol with 5 mols ethylene oxide addition. Steam was used on the hydrocarbon inlet line and on the reactor jacket to raise the temperature of the nonyl phenol ethoxylate to between 180 and 200° F., and the temperature of the jacket was maintained at 212° F. The air flow is started and raised to about 3.5 cubic feet per minute per tube, and when the flow is about 3.0 cubic feet per minute per tube, the back pressure is about 3½ pounds. Flow of nonyl phenol-ethoxylate is then started at a rate of about 5.5 pounds per hour and sulfur trioxide flow initiated at 1 pound per hour, per reactor tube component, which produces a back pressure of between 4 and 6 p.s.i. The temperature of the acid emerging from the reactor will be noted to be about 100 to 105°, and in experiments conducted the acid was rapidly quenched to 40° C. by pumping it through a heat exchanger, removing part of the acid, and returning part of the cooled acid to the receiver located beneath the lower ends of the reactor tubes 18. Under the conditions stated, the product yield is 6.5 pounds of the sulfated material per hour. In the manner of the preceding examples, the products obtained were within specification of low unsulfonated matter and light color.

*Example VI*

A mixture of 50% by weight methyl palmitate and 50% by weight methyl stearate was sulfonated using generally the procedures earlier described with a throughput of two pounds of sulfur trioxide per hour per tube, by utilizing cooling water in the reactor jacket maintained generally between 125 and 135°, and immediate quenching of the product obtained. The outlet temperature was found to be 58 to 66° C., and in a series of tests the unsulfonated ester obtained varied from 1.4 to 10.1%, the α sulfo ester was generally in the range of from 34.6 to 45.2%, and the α sulfo carboxy acid was present in an amount of from 18.1 to 27.8%. The acid obtained was analyzed by conventional techniques, and the desired product, sulfo ester, was found to be acceptable from a color standpoint.

It may be seen from the foregoing examples that applicant has provided a continuous process for sulfonating hydrocarbons, in which a flowable film of the hydrocarbon is introduced into a reaction zone, the film impinged by a mixture of sulfur trioxide and an inert diluent gas at a pressure sufficient to produce violent turbulence in the film and an intimate mixture of the hydrocarbon and the sulfur trioxide-inert diluent gas, and in which the reaction zone cooled to a temperature sufficient to remove a portion of the exothermic heat of the sulfonation reaction while maintaining the temperature of the film sufficiently high so that the film viscosity is relatively low and the desired violent turbulence is effected, under conditions of gaseous residence times of less than 0.2 second. As a result, there is obtained by the instant process improved productivity, improved product quality and improved economy, in comparison with the prior art methods. It is important to emphasize that in the present process there is utilized an extremely fast or short contact or residence time between the sulfur tri-oxide-diluent gas mixture and the sulfonatable organic compound. Experience has demonstrated that generally about 95% of the reaction occurs within the first foot of the reactor tube 18 when employing the tube dimensions and gas volumes indicated. The residence time is calculated by dividing the volume of the tube by the volume of gas per unit time, and as was stated hereinabove, the reaction time utilizing the exemplary conditions stated in the preceding paragraphs is generally between about 0.10 and 0.20 second for each reactor tube.

It is a further feature of the instant invention that the pressurized sulfur trioxide-inert gas mixture be the sole means of effecting marked or violent turbulence of the flowing hydrocarbon film (although gravity also inherently acts on the essentially downwardly flowing film), and that the high turbulency be produced simultaneously with controlled reduced viscosity of the film and effective heat exchange to prevent formation of an undesirable product. The gaseous mixture is thus the sole gaseous medium introduced into the reaction zone. As was started earlier and as appears in FIGURE 3 of the application drawings, a film of sulfonatable organic compound 40 is introduced into each reactor tube 18 at the upper end thereof from the jet nozzle 29 communicating with the chamber or reservoir 25. The film flows axially downwardly along the inner walls of each reactor tube 18, and generally immediately after entering the upper ends of the reactor tubes the film 40 is impinged by a blast 41 of vaporized sulfur trioxide and an inert gas in the form of dry air, nitrogen or the like to produce violent turbulence in the film 40, as indicated in somewhat exaggerated form by the numeral 40a in FIGURE 3. There is accordingly effected an intimate admixture between the sulfonatable film 40a and the impinging gas 41, and the sulfonation reaction is essentially complete within the reaction zone, generally designated in FIGURE 3 by the legend Z.

Essentially simultaneously, coolant is admitted to the cooling jacket 14c to effect an efficient heat exchange with the walls of the reactor tubes 18, immediately removing a portion of exothermic heat of the sulfonation reaction. As is known, dilution of the sulfur trioxide with an inert carrier gas permits rapid dissipation of the exothermic heat of the reaction to the surrounding inert gaseous medium; however, by the instant invention providing a further cooling means, there is essentially no likelihood that an undesirable product will be formed. Equally importantly, the coolant admitted to the jacket 14c is controlled as to temperature so that while some of the heat of the sulfonation reaction is removed, yet the temperature is not reduced to the point at which the sulfonatable organic compound has a high viscosity, which increases the contact time and induces side reactions. Specifically, by controlling the temperature of the film 40 and the back pressure on the film, the film viscosity is maintained generally between 1 and 20 cps., in order that the film is relatively thin and in a condition whereby impingement with the high pressure gas blast 41 produces the required violent turbulence. At the same time, however, the gaseous jet linear velocity is controlled by regulation of the sulfur trioxide throughput and back pressure so that pulsation is not produced with resultant pressure pulsating eddy effects. Of course, particular conditions will result in different gas jet linear velocities, although experiments of the character outlined in Example I have indicated that the gaseous jet linear velocity should not exceed 110,000 cm./min. for this specific tube.

It will be further appreciated that the specific apparatus disclosed can be varied without departing from the novel concepts of this invention, and with reference to FIGURE 1, the source of liquid sulfur trioxide 50 could be a bomb or bulk storage tank, while desirably the connecting pump 51 is a non-pulsating proportioning pump to prevent undesirable pulsation in the reactor 10, or the $SO_3$ may be furnished by pressure displacement of the liquid $SO_3$ from the $SO_3$ storage device. As earlier noted, the pump 51 feeds liquid sulfur trioxide through a measuring device 52, which may be a "rotameter," communicating with a vaporizer 53, desirably of the falling film steam jacketed flash type.

The inert gas supply 54 may be provided by gaseous nitrogen tanks or means for supplying and drying air, or as the introductory material brought out, the inert gas may take other forms. The diluent gas supply 54 communicates with a pressure measuring device 55, which may also be a "rotameter," and the vaporized sulfur trioxide and inert gas are mixed in valve means 56 in generally the proportions of 3:1 to 50:1 air or nitrogen to sulfur trioxide by volume. The back pressure on the diluent gas-sulfur trioxide mixture is measured at 57 by a manometer or the like, and the air or nitrogen-sulfur trioxide mixture is then fed into the gas reservoir 34 of the reactor chamber housing 11. The sulfonatable organic compound is stored at 58 in suitable tanks or the like, and by means of a feed pump 59 is directed through a pressure controller 60 to the reservoir 25 of the reactor 10. Certain sulfonatable organic compounds, as for example dodecyl benzene, require heating to reduce the viscosity to a proper level, and accordingly, heating means would be interposed between the source 58 and pump 59. The flow of material to be sulfonated may be controlled directly by means of a pressure control on the calibrated organic liquid control jets or the flow may be controlled by some other flow device, such as a non-pulsating proportioning pump. Upon admission to the reactor 10, the described steps of the instant process takes place, during which an extremely fast reaction time in company with relatively high temperatures produce a relatively low viscosity film and a particularly effective sulfonation reaction. While not earlier stated, experience has demonstrated that the diluent gas should be at a dew point of at least minus 20° or lower to minimize the $H_2SO_4$ contribution.

Expressed in other terms, the instant invention comprises a process of sulfating and sulfonating an organic compound taken from the group consisting of alcohols, olefins, monocyclic aromatic hydrocarbons and polycyclic aromatic hydrocarbons, in which process sulfur trioxide is reacted with said organic compound by contacting said organic compound with a mixture of inert gas and from 2–12% by volume of the gas mixture of gaseous sulfur trioxide, said process being carried out by establishing turbannular flow of said organic compound (i.e., establishing turbulence in an annulus or annular body or film of such liquid compound) and introducing said mixture of inert gas and sulfur trioxide by feeding said mixture within and concentric to said turbannular flowing organic compound and beyond the point of full turbannular flow of said organic compound, cooling the resulting reaction mixture with room temperature water immediately beyond the point where said sulfur trioxide-inert gas mixture contacts and reacts with said turbannular flowing organic compound.

Various other modifications, other than those discussed, can, of course, be effected without departing from the novel concepts of the instant invention.

We claim as our invention:

1. A continuous process for a reaction selected from the group consisting of sulfation and sulfonation between sulfur trioxide and a liquid organic compound selected from the group consisting of alcohols, olefines, fatty acid esters, and polycyclic and monocyclic hydrocarbons, which comprises forming a liquid film of the organic compound on a supporting and confining heat-exchange surface defining a reaction zone, forming in predetermined concentration a pressurized diluted reactant gaseous mixture of an inert gas and gaseous reactant sulfur trioxide containing a given proportion within the range of 5:1 to 50:1 inert gas to sulfur trioxide by volume, introducing said gaseous mixture into the confining reaction zone formed by the heat-exchange surface and impinging said gaseous mixture against said liquid film at a high velocity to induce marked turbulence therein and effect an exothermic reaction involving the aforesaid reaction, and removing at least a portion of the exothermic heat of reaction by heat-transfer through the heat-exchange surface while maintaining the film viscosity sufficiently low to permit said impinging gas to effect said marked turbulence, said liquid film being subjected to the aforesaid pressurized gaseous mixture within substantially 0.5 second.

2. A continuous process for a reaction selected from the group consisting of sulfation and sulfonation between sulfur trioxide and a liquid organic compound selected from the group consisting of alcohols, olefines, fatty acid esters, and polycyclic and monocyclic hydrocarbons, which comprises forming a liquid film of the organic compound on a supporting and confining heat-exchange surface defining a reaction zone, forming in predetermined concentration a pressurized diluted reactant gaseous mixture of an inert gas and gaseous reactant sulfur trioxide containing a given proportion within the range of 5:1 to 50:1 inert gas to sulfur trioxide by volume, introducing said gaseous mixture into the confining reaction zone formed by the heat-exchange surface and impinging said gaseous mixture against said liquid film at a high velocity to induce marked turbulence therein and effect an exothermic reaction involving the aforesaid reaction, and removing at least a portion of the exothermic heat of reaction by heat-transfer through the heat-exchange surface while maintaining the film viscosity sufficiently low to permit said impinging gas to effect said marked turbulence, said liquid film being subjected to the aforesaid pressurized gaseous mixture within substantially 0.5 second, said liquid film falling downwardly along said heat-exchange surface while the inert diluent gas containing gaseous reactant sulfur trioxide is flowing at substantial velocities by and impinging on said film in the aforesaid reaction zone effecting in the film essentially simultaneously marked turbulence in the falling film as well as essentially instantaneous introduction of substantially all of the gaseous reactant present into the contacted liquid film with correspondingly rapid substantial elimination of the aforesaid gaseous reactant per se and resultant rapid exothermic heat generation which in turn is dissipated substantially rapidly by said heat-exchange surface carrying and contacting the liquid film, whereby the gaseous reactant per se of said pressurized gaseous mixture used is substantially instantaneously caused to react with the aforesaid liquid organic compound while the same is flowing downwardly in film form along the surface of said heat-exchange surface and the film simultaneously being subjected to the overall effect of substantial gaseous velocities flowing along and impinging on said film thereby creating the aforesaid marked turbulence in the falling film plus extremely rapid exothermic heat withdrawal through said surface concurrently with such aforesaid instantaneous reaction between the gaseous reactant portion and the unreacted liquid organic compound portion of the downwardly falling film.

3. A continuous process for a reaction selected from the group consisting of sulfation and sulfonation between sulfur trioxide and a liquid organic compound selected from the group consisting of alcohols, olefines, fatty acid esters, and polycyclic and monocyclic hydrocarbons, which comprises forming a liquid film of the organic compound on a supporting and confining heat-exchange surface defining a reaction zone, forming in predetermined concentration a pressurized diluted reactant gaseous mixture of an inert gas and gaseous reactant sulfur trioxide containing a given proportion within the range of 5:1 to 50:1 inert gas to sulfur trioxide by volume, introducing said gaseous mixture into the confining reaction zone formed by the heat-exchange surface and impinging said gaseous mixture against said liquid film at a high velocity to induce marked turbulence therein and effect an exothermic reaction involving the aforesaid reaction, and removing at least a portion of the exothermic heat of reaction by heat-transfer through the heat-exchange surface while maintaining the film viscosity sufficiently low to permit said impinging gas to effect said marked turbulence, said liquid film being subjected to the aforesaid pressurized gaseous mixture within substantially 0.5 second, the liquid film moving essentially downwardly on said heat-exchange surface and essentially the sole force moving such liquid film, in addition to gravity, being the high velocity of gas.

4. A process as defined in claim 3, wherein the organic compound is an alcohol.

5. A process as defined in claim 1, wherein the alcohol is an ethoxylated nonylphenol.

6. A process as defined in claim 3, wherein the organic compound is dodecylbenzene.

7. A process as defined in claim 1, wherein the preformed pressurized gaseous mixture is the sole gaseous medium introduced into said reaction zone.

8. A process as claimed in claim 1, wherein said confining heat-exchange surface is a substantially cylindrical surface having a substantially vertical axis, said preformed gaseous mixture is introduced at a temperature of between about 40 and 50° C. to effect substantially simultaneous impingement of said gaseous mixture against said liquid and the formation of a substantially concentric flowing annular film of said liquid organic compound in which such impingement of the gaseous mixture induces said marked turbulence, and the temperature of said resulting reaction mixture is controlled in said reaction zone to maintain said reaction mixture at said film viscosity.

9. A process as claimed in claim 8, wherein said gaseous mixture is introduced and said annular film of said organic compound is caused to flow downwardly, the temperature of the resulting reaction mixture is controlled by indirect heat exchange to remove some of the exothermic heat of reaction and a pressure drop is created from the point of entry of the sulfur trioxide inert gas mixture into the reaction zone to the point of reaction therein with said organic compound, and the total gaseous residence time within said reaction zone is less than 0.2 second.

10. A process as defined in claim 9, in which the organic compound is an alcohol.

References Cited by the Examiner

UNITED STATES PATENTS

| | | | |
|---|---|---|---|
| 1,082,530 | 12/13 | Kaufler et al. | 23—252 |
| 2,088,027 | 7/37 | Law et al. | 260—459 |
| 2,160,343 | 5/39 | Ross | 260—460 |
| 2,210,316 | 8/40 | Dreisback | 260—460 |
| 2,758,977 | 8/56 | Knowles et al. | |
| 2,828,331 | 3/58 | Mirisic | 260—400 XR |
| 2,865,958 | 12/58 | Davies et al. | 260—456 XR |
| 2,923,728 | 2/60 | Falk et al. | 260—459 |
| 2,927,006 | 3/60 | Brooks | 23—252 |
| 2,931,822 | 4/60 | Tischbirek | 260—459 |
| 2,975,141 | 3/61 | Blinoff et al. | 260—459 X |

FOREIGN PATENTS 553,598  5/43  Great Britain.

OTHER REFERENCES

Haynes: "Chemical Trade Names," 2nd ed., page 304 (1955).

CHARLES B. PARKER, *Primary Examiner.*